Patented Jan. 17, 1933

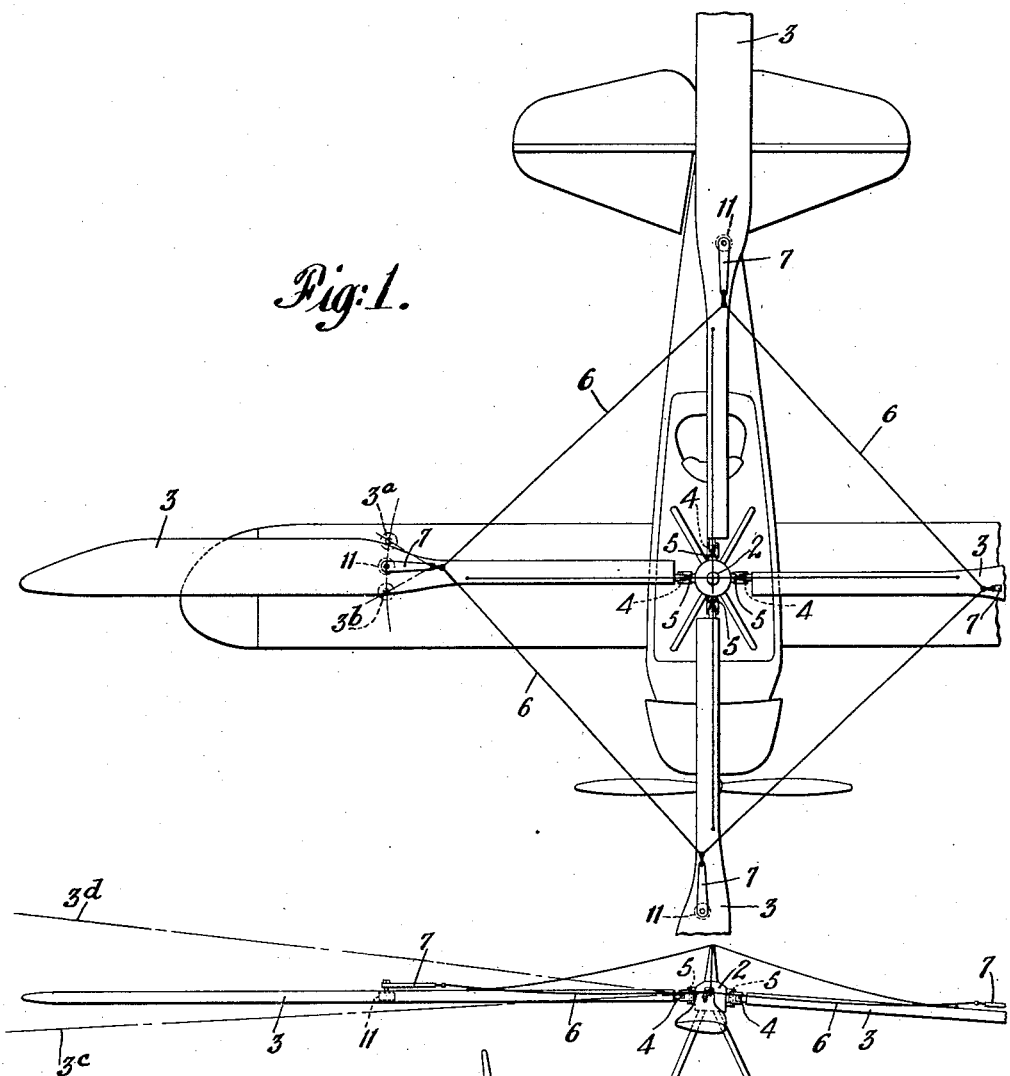
Fig. 1.
Fig. 2.
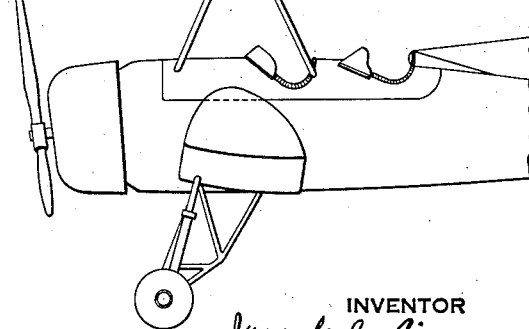

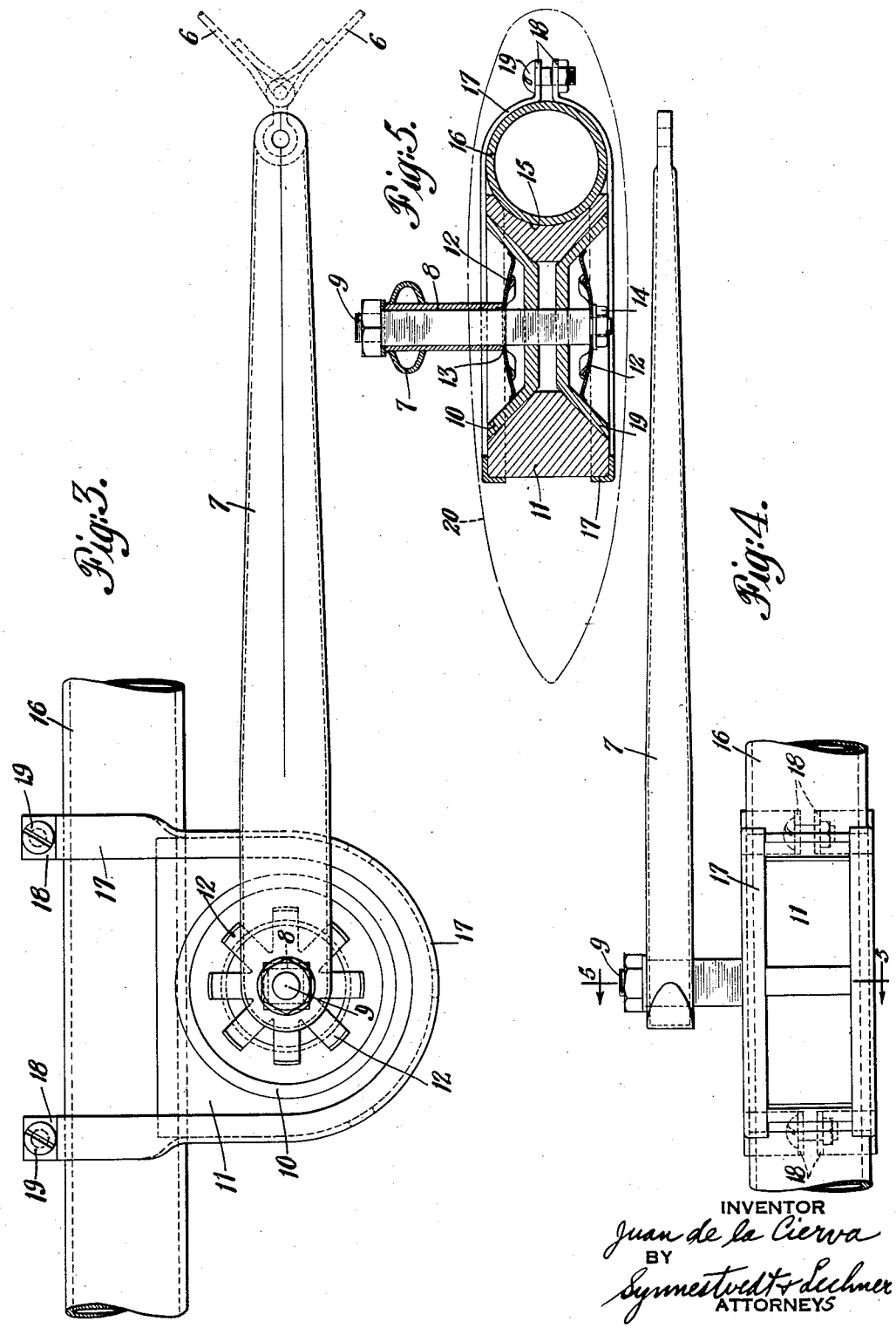

1,894,673

UNITED STATES PATENT OFFICE

JUAN DE LA CIERVA, OF LONDON, ENGLAND, ASSIGNOR TO AUTOGIRO COMPANY OF AMERICA, OF PHILADELPHIA, PENNSYLVANIA, A CORPORATION OF DELAWARE

AIRCRAFT WITH ROTATIVE WINGS

Application filed December 28, 1929, Serial No. 416,356. Renewed December 16, 1931.

This invention relates to aircraft with rotative wings and is particularly useful in connection with aircraft having a rotative sustaining unit, comprising a plurality of blades, which may be revolved by autorotation, i. e., rotation under the influence of air flow acting thereon.

In machines of this type, it is now customary to provide the individual blades of the rotor with means of pivotal movement in at least two directions with respect to the rotor's axis of rotation, one of these movements being about a pivot axis extending substantially transversely or tangentially to the axis of the rotor, and the other being about a pivot axis concentric or parallel with the rotor's axis. In other words each blade is articulated for swinging movement up and down out of the general plane of rotation of the rotor as a whole, and for swinging movement forward and backward substantially in said plane. Alternatively, the blades may be made flexible, or may be flexibly mounted.

This double articulation of the blades is disclosed and claimed in my copending application Serial No. 145,655, filed November 1, 1926, but is described herein because of its relation to, and its utilization as a part of the present invention.

Such articulation provides for the maintenance, at all times, of freedom for each blade to assume a position or attitude which will compensate for differences in lift, centrifugal force, drag, etc., as the rotor revolves. To keep the blades properly spaced one from another, however, particularly when the rotor is just being started and before it has attained the proper speed for sustaining the machine, or when it has slowed down below a given rate of speed, has been a difficult problem, owing to the fact that any means employed must give the necessary freedom of movement (within limits) for each individual blade.

One method employed heretofore involves the interconnecting of the blades by elastics or springs, or the interpolation of slack cords or cables between blades, each cord carrying a weight. These, and other similar arrangements heretofore used on rotative-wing aircraft, suffer from the severe strains imposed upon them as the blades are getting up to speed, are awkward to adjust and ungainly in appearance, and present considerable parasite resistance.

The most troublesome effect of their use, however, is that they are apt to set up, or build up, particularly at certain rotor speeds, artificial vibrations or oscillations in the blades, which must be overcome, or must "die out", before smooth operation of the machine can be attained.

The primary object of my invention is to make it possible, if desired, to eliminate entirely all spring, cushion, elastic, or weight interconnections or interbraces between the blades or wings of rotative sustaining, and/or propelling, units, thereby obviating all of the aforementioned difficulties.

In general, the invention contemplates the provision of a non-reactive damping device for the blades of the rotor.

More particularly, it involves a blade interconnecting and spacing system which, while providing for the necessary individual articulative movements, sets up no reactive movement such as would tend to start or build up a resonant vibration or oscillation of the blades.

A further object of the invention is to increase automatically the resistance to displacement of the blades, as such displacement increases; that is, the farther a blade moves from its normal radial position with respect to the rotor axis, the greater will be the resistance to further movement in that direction. The invention further contemplates the attainment of these ends by a non-reactive resistance, or shock-absorbing device. In addition to this, I so arrange the device that it will preferably be inoperative or ineffective in flight, so that free movement of the blades will not be interfered with when the rotor is sustaining the weight of the machine and encountering variations in air-flow, lift, etc.

Specifically, the invention contemplates the provision, in a multi-bladed sustaining or propelling unit in which the blades are articulated or pivoted to a common axis member, of a friction shock absorbing and damping device mounted upon each blade, a lever, arm or crank secured to an element of said device and normally extending preferably parallel to the longitudinal axis of the blade, a means of adjusting the friction or pressure of each damping device, and an interconnection between the levers, preferably by a light cable extending in equal lengths from the end of one lever to the end of the next, and so on.

How these objects and advantages, together with such others as are incident to the invention or will occur to those skilled in the art, are attained, will appear from the following description of my invention viewed in the light of the accompanying drawings, in which:

Figure 1 is a fragmentary, more or less diagrammatic, top plan view of a rotative system of aerofoils or blades, comprising an aircraft sustaining or propelling unit, illustrating one embodiment of my invention as applied thereto;

Figure 2 is a side elevational view of the same;

Figure 3 is an enlarged plan view of a portion of Fig. 1 illustrating in more detail the construction, and the application to a blade, of my improvement;

Figure 4 is a side elevation of the same; and

Figure 5 is a section taken on the line 5—5 of Fig. 4.

Referring first to Fig. 1, it will be seen that I have illustrated a rotor or sustaining unit (which is here shown as being of the autorotative type) comprising an axis member 2, and a plurality of aerofoils or blades 3 which are individually articulated to the axis member by pivots 4, 5. The pivots 4, being substantially tangential to a circle drawn around the axis of rotation of the rotor, provide for movement of the blades up and down out of the general plane of rotation, to effect the necessary equalization of lift during operation. The pivots 5, being substantially parallel with the axis of rotation of the rotor and closely positioned with respect thereto, provide for angular adjustment fore and aft of a normal position radial to said axis. The specific location of the pivots 5 especially in their relation to the pivots 4 and the common axis 2, as just described, and as shown in Figs. 1 and 2, is not per se my invention but is fully disclosed and claimed in the copending application of Joseph S. Pecker, Serial No. 561,344, filed September 5, 1931.

It will readily be seen that, especially during starting of the rotor, it is necessary to prevent excessive displacement of the blades from normal position and to maintain adequate spacing between blades. To this end I provide my improved mechanism, hereinbelow described.

A cable 6, of equal length between blades, interconnects the inner ends (i. e., the ends nearest to the rotor axis) of levers 7, each of said levers being mounted on a blade with its central longitudinal line normally in substantial parallelism with the longitudinal axis of the blade.

Referring particularly to Figs. 3, 4 and 5, it will be seen that each lever or horn 7, which is preferably formed of streamlined hollow tubing, is mounted at its outer end on a squared section 8 of the stud 9 so as to be non-rotative with respect thereto, or it may be formed integral therewith. Also non-rotatively fixed on said stud are two opposed cones 10, one frictionally engaging the upper and one the lower conical face of the fixed block 11. A pair of spider springs 12, or other suitable tension devices, one re-acting against the shoulder 13 and the other against the adjusting nut 14, provide the necessary pressure of the cones upon the block 11.

The block 11, or whatever friction member is employed, may conveniently be secured by entering its inner end into a slot or recess in the blade beam or main spar 16, or, as here shown, having its inner end 15 curved to fit said beam, and binding it to said spar or beam by a four-eared clip 17, the ears 18 of which are secured together in pairs as by studs 19.

The entire device, with the exception of the horn 7 and cable 6 may thus be positioned entirely inside of the covering 20 of the blade, or, if the aerofoil section be not extended inward as far as the point of mounting of the friction device, the device will at least lie behind the beam of the blade and therefore need not add to the drag or head-resistance of the blade.

In the operation of the device, it will now be seen that any movement of a blade toward the position 3a or the position 3b (see Fig. 1), assuming for the moment that the other blades and their levers remain radial to the rotor axis, will be resisted by the frictional resistance of the damping device, the end of the horn 7 being held at a fixed point by the cable 6 connected to the horns of all the blades. The effective resistance will then increase as the blade displacement increases, since the effective lever arm of the horn 7 decreases as the friction device is turned. In actual practice, of course, the resistance to movement of any blade is not effected solely by its own damping device but is divided between the several damping devices in varying degrees, the movement of the lever 7 of the displaced blade being the greatest.

Furthermore, as will be seen from Fig. 2, as the blades attain normal rotational speed for flight and pivot or "cone" upwardly from the line of rest, 3c to their active position, 3d, the cables 6 are necessarily slackened automatically, so that the damping device is substantially inoperative when the machine is in flight. The device of the present invention may, obviously, be employed separately or in conjunction with the usual elastic blade interconnection.

From the foregoing it will appear that the desired objects are attained in a very simple and efficient manner without complicated apparatus, and particularly that re-active effects with their attendant setting up of vibration are eliminated.

What I claim is:—

1. In combination with a rotative sustaining unit for aircraft, having a plurality of blades articulated to the axis of rotation, a non-reactive damping device for the blades.

2. In combination with a rotative sustaining unit for aircraft, having a plurality of blades articulated to the axis of rotation, a non-resilient vibration-damping interconnection between blades.

3. In combination with a rotative sustaining unit for aircraft, having a plurality of blades connected to an axis of rotation, means permitting relative movements between blades, and means for restricting such movement to predetermined limits including a non-reactive device yieldingly resistive to changes of blade position.

4. In combination with a rotative sustaining unit for aircraft, having a plurality of blades connected to an axis of rotation, means permitting relative movements between blades, and means for restricting such movement to predetermined limits including a non-reactive device yieldingly resistive to changes of blade position and means whereby such non-reactive resistance is automatically increased as blade displacement increases.

5. In combination with a rotative sustaining unit for aircraft, having a plurality of blades connected to an axis of rotation, means permitting relative movements between blades, and means for restricting such movement to predetermined limits, including a non-reactive device yieldingly resistive to changes of blade position, said device comprising, for each blade, a friction shock absorber.

6. In combination with a rotative sustaining unit for aircraft, having a plurality of blades connected to an axis of rotation, means permitting relative movements between blades, and means for restricting such movement to predetermined limits including a non-reactive device yieldingly resistive to changes of blade position, said device comprising, for each blade, an adjustable friction shock absorber.

7. In an aircraft with rotative wings, means providing for independent automatic adjustment of each wing vertically and angularly with respect to the axis of rotation to compensate for variations in lift and thrust forces, and non-reactive means resisting differential angular movement between wings.

8. In an aircraft with rotative wings means providing for independent automatic adjustment of each wing vertically and angularly with respect to the axis of rotation to compensate for variations in lift and thrust forces, and non-reactive means resisting differential angular movement between wings, said resistive means including a friction device on each wing and an interconnection between said devices.

9. In an aircraft with rotative wings, means providing for independent automatic adjustment of each wing vertically and angularly with respect to the axis of rotation to compensate for variations in lift and thrust forces, and non-reactive means resisting differential angular movement between wings, said resistive means including a friction shock absorber for each wing having an actuating arm in substantial parallelism with the longitudinal axis of the wing and interconnecting means between the free ends of the several arms.

10. In an aircraft with rotative wings, means providing for independent automatic adjustment of each wing vertically and angularly with respect to the axis of rotation to compensate for variations in lift and thrust forces, and non-reactive means resisting differential angular movement between wings, said resistive means including a friction shock absorber for each wing having an actuating arm in substantial parallelism with the longitudinal axis of the wing and extending inwardly toward the axis of rotation, and interconnecting means between the free ends of the several arms.

11. In a device of the character described, a plurality of blades each independently adjustable toward and away from adjacent blades, and non-reactive resistance mechanism controlling such adjustment.

12. In a device of the character described, a plurality of blades each independently adjustable toward and away from adjacent blades, and non-reactive resistance mechanism controlling such adjustment, said mechanism including frictionally-engaging members associated with each blade, one being fast on the blade and another movable with respect thereto, a horn connected to the movable member, and a common means to which all the horns are connected in equi-spaced relation.

13. In a rotative wing device of the character described, a frictional damping device mounted on each wing, in large part within the confines thereof, an operating member for each of said damping devices, and an external interconnection between said members.

14. In combination with a rotative sustaining unit for aircraft, having a plurality of blades articulated to the axis of rotation, means for controlling articulative movement including a non-reactive damping device.

15. In combination with a rotative sustaining unit for aircraft, having a plurality of blades articulated to the axis of rotation, means for controlling articulative movement including a non-reactive damping device arranged to become substantially ineffective as the rotational movement approaches normal speeds for flight.

16. In combination with a rotative sustaining unit for aircraft, having a plurality of blades constructed and arranged for individual movement with respect to the axis of rotation under the influence of variations in centrifugal, lift and other forces, non-reactive damping means for the blades.

17. An air rotor including a rotatable hub, blade means thereon constructed and arranged for movement in addition to the rotative movement, so as to compensate for variations in inertia and other forces, and anti-reactive control means for blade movement.

18. An air rotor comprising a normally freely rotative axis structure, rotative sustaining wing means, means of pivotal mounting of said wing means on said axis structure, and non-rebounding damping means for pivotal wing movements with respect to said axis structure.

19. In an aircraft, a generally upright axis structure, rotative sustaining wing means, pivot means mounting said wing means on said axis structure in such manner that the wing means are substantially free for rotation and oscillation under the action of relative air-flow and other flight forces, and mechanism for controlling the oscillative wing movements including means for varying the ratio between the degree of controlling effect and the degree of wing oscillation at different amplitudes or ranges of oscillation.

20. An aircraft sustaining rotor including an upright axis structure mounted for normally free rotation in flight, rotative wing means thereon positioned to be normally rotated about the axis under the influence of the relative air-flow in flight, said wing means having mounting means constructed and arranged to provide for movements of the wing means in addition to the rotative movement, so as to compensate for variations in the flight forces produced on the wing means around the circle of rotation, and non-rebounding control means for such wing movements.

In testimony whereof I have hereunto signed my name.

JUAN DE LA CIERVA.